US008402186B2

United States Patent
Jayakumar

(12) United States Patent
(10) Patent No.: US 8,402,186 B2
(45) Date of Patent: Mar. 19, 2013

(54) BI-DIRECTIONAL HANDSHAKE FOR ADVANCED RELIABILTY AVAILABILITY AND SERVICEABILITY

(75) Inventor: Sarathy Jayakumar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/459,423

(22) Filed: Jun. 30, 2009

(65) Prior Publication Data

US 2010/0332707 A1  Dec. 30, 2010

(51) Int. Cl.
*G06F 13/42* (2006.01)
*G06F 12/00* (2006.01)
*G06F 13/14* (2006.01)
*G06F 13/38* (2006.01)

(52) U.S. Cl. .......... 710/105; 710/240; 710/242

(58) Field of Classification Search .......... 710/105, 710/240–244
See application file for complete search history.

(56) References Cited

U.S. PATENT DOCUMENTS

| | | | | |
|---|---|---|---|---|
| 5,392,422 A * | 2/1995 | Hoel et al. | ............ | 710/113 |
| 5,418,967 A * | 5/1995 | Simcoe et al. | ............ | 710/241 |
| 5,623,672 A * | 4/1997 | Popat | ............ | 710/240 |
| 5,870,610 A * | 2/1999 | Beyda | ............ | 717/173 |
| 5,894,562 A * | 4/1999 | Moyer | ............ | 710/113 |
| 5,953,746 A * | 9/1999 | Crocker et al. | ............ | 711/173 |
| 5,974,569 A * | 10/1999 | Nickles | ............ | 714/38.1 |
| 6,014,729 A * | 1/2000 | Lannan et al. | ............ | 711/150 |
| 6,173,398 B1 * | 1/2001 | Kim | ............ | 713/2 |
| 6,718,488 B1 * | 4/2004 | Jue et al. | ............ | 714/43 |
| 6,742,121 B1 * | 5/2004 | Safadi | ............ | 713/187 |
| 6,748,526 B1 * | 6/2004 | Thangadurai | ............ | 713/1 |
| 7,209,982 B2 * | 4/2007 | Nakanishi | ............ | 710/38 |
| 7,231,474 B1 * | 6/2007 | Helms et al. | ............ | 710/110 |
| 7,269,534 B2 * | 9/2007 | Mugunda et al. | ............ | 702/182 |
| 7,730,205 B2 * | 6/2010 | Rothman et al. | ............ | 709/238 |
| 2004/0039724 A1 * | 2/2004 | Stephan et al. | ............ | 707/1 |
| 2005/0268081 A1 * | 12/2005 | Han et al. | ............ | 713/1 |
| 2008/0040524 A1 * | 2/2008 | Zimmer et al. | ............ | 710/267 |
| 2008/0126597 A1 * | 5/2008 | Hirai | ............ | 710/19 |
| 2008/0242152 A1 * | 10/2008 | Yeh et al. | ............ | 439/625 |
| 2009/0044002 A1 * | 2/2009 | Kim et al. | ............ | 713/2 |

(Continued)

FOREIGN PATENT DOCUMENTS

GB  2237422 A  *  5/1991
JP  03158919 A  *  7/1991

(Continued)

OTHER PUBLICATIONS

Kallahalla, M.; Uysal, M.; Swaminathan, R.; Lowell, D.E.; Wray, M.; Christian, T.; Edwards, N.; Dalton, C.I.; Gittler, F.; , "SoftUDC: a software-based data center for utility computing," Computer, vol. 37, No. 11, pp. 38-46, Nov. 2004.*

(Continued)

*Primary Examiner* — Faisal M Zaman

(74) *Attorney, Agent, or Firm* — International IP Law Group, P.L.L.C.

(57) ABSTRACT

In some embodiments a signal is sent from a Basic Input/Output System to a device to indicate that the Basic Input/Output System needs to obtain control of shared resources. A signal is sent from the device to the Basic Input/Output System that indicates that the Basic Input/Output System can now control the shared resources. Other embodiments are described and claimed.

22 Claims, 2 Drawing Sheets

U.S. PATENT DOCUMENTS

2009/0327681 A1 * 12/2009 Rangarajan et al. .............. 713/2
2010/0281225 A1 * 11/2010 Chen et al. .................... 711/147

FOREIGN PATENT DOCUMENTS

| | | | | |
|---|---|---|---|---|
| JP | 10214183 | A | * | 8/1998 |
| JP | 2004272576 | A | * | 11/2004 |
| JP | 2008165372 | A | * | 7/2008 |
| JP | 2008276691 | A | * | 11/2008 |
| JP | 2011232804 | A | * | 11/2011 |

OTHER PUBLICATIONS

Chunxiao Li; Raghunathan, A.; Jha, N. K.; , "Secure Virtual Machine Execution under an Untrusted Management OS," Cloud Computing (CLOUD), 2010 IEEE 3rd International Conference on , pp. 172-179, Jul. 5-10, 2010.*

* cited by examiner

BI-DIRECTIONAL HANDSHAKE FOR ADVANCED RELIABILTY AVAILABILITY AND SERVICEABILITY

TECHNICAL FIELD

The inventions generally relate to advanced reliability availability and serviceability.

BACKGROUND

During advanced Reliability Availability and Serviceability (RAS) events, the Basic Input/Output System (BIOS) of a computer needs to obtain control (for example, from a System Service Processor, a Baseboard Management Controller, and/or a Manageability Engine) of system resources (for example, such as System Management Bus devices). No current mechanism exists for the BIOS to obtain such control of system resources.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Some embodiments of the inventions relate to bi-directional handshake for advanced Reliability Availability and Serviceability (RAS) features.

Figure 1:
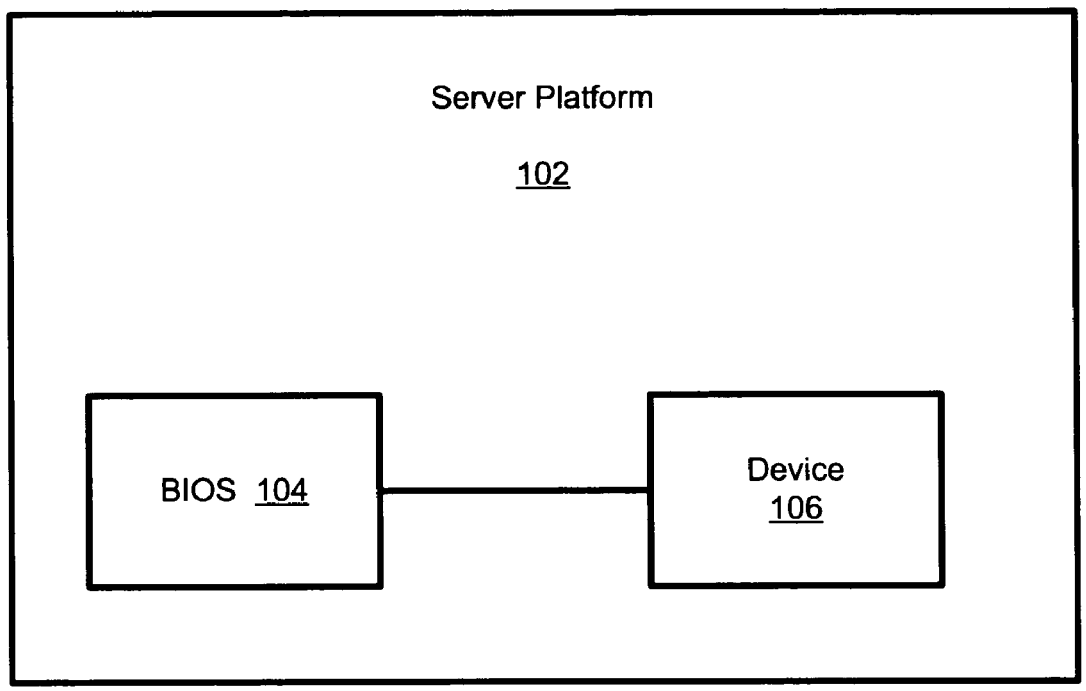
FIG. 1 illustrates a system according to some embodiments of the inventions.

FIG. 1 illustrates a system 100 according to some embodiments. In some embodiments system 100 includes a server platform 102 including a Basic Input/Output System 104. In some embodiments, system 100 further includes another device 106 (for example, in some embodiments, the other device 106 is a Service Processor, a System Service Processor, a Baseboard Management Controller, and/or a Manageability Engine). Although the device 106 is illustrated in FIG. 1 as being included in server platform 102, it is noted that in some embodiments, device 106 is not included within server platform 102. According to some embodiments, BIOS 102 goes through a Power On Self Test (POST) operation, and asserts a signal (for example, a General Purpose Input/Output signal or GPIO signal) to let the other device 106 know that the POST operation has ended, and that the other device 106 can now take control of shared resources (for example, shared resources such as System Management Bus devices or SMBus devices). In some embodiments, a signal (for example, a GPIO signal may be used between the BIOS 102 and the other device 106 in order to allow the BIOS to take back control of the shared resources.

During RAS events such as Advanced RAS events, for example, the BIOS needs to get back control of system resources from another device (for example, from the System Service Processor, the Baseboard Management Controller, and/or the Manageability Engine). Examples of system resources of which the BIOS may need to obtain control include System Management Bus (SMBus) devices. There was previously no mechanism for the BIOS to obtain such control. In some current platforms, for example, the BIOS asserts a General Purpose Input/Output (GPIO) signal to another device such as the System Service Processor (SSP), the Baseboard Management Controller (BMC), and/or the Manageability Engine (ME) to inform the other device that the BIOS has completed the POST operation, and that the other device (SSP, BMC, and/or ME, for example) is free to take control of shared resources such as SMBus devices. With Advanced RAS, it is imperative that the BIOS takes back control of these shared resources in response to RAS events in runtime. However, according to some embodiments, a handshake mechanism is used between the BIOS and other devices of the system so that there is no clash in accessing shared resources between the BIOS and other devices such as, for example, the SSP, BMC, and/or ME, during runtime.

Figure 2:
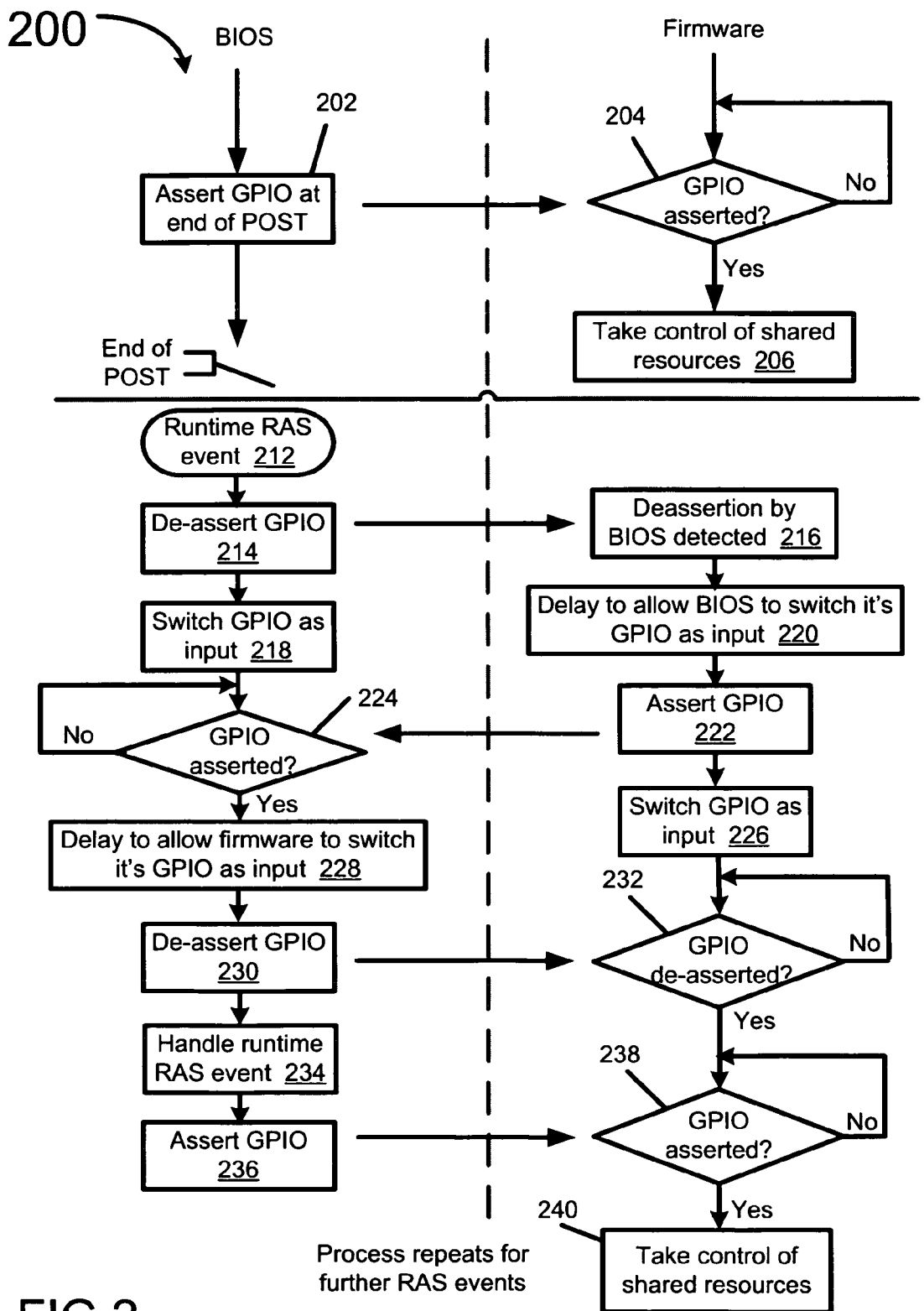
FIG. 2 illustrates a flow according to some embodiments of the inventions.

FIG. 2 illustrates a flow 200 according to some embodiments. Flow 200 includes items performed by the Basic Input/Output System (BIOS) on the left side of FIG. 2, and items performed by firmware (for example, in some embodiments by firmware of a System Service Processor, a Baseboard Management Controller, and/or Manageability Engine of a computer system such as a server system) on the right side of FIG. 2.

At 202 the BIOS asserts a signal such as a General Purpose Input/Output (GPIO) signal at the end of a Power On Self Test (POST) operation performed by the BIOS. At 204 the firmware determines whether or not the GPIO has been asserted by the BIOS. If the GPIO has not yet been asserted at 204, then the firmware flow stays at 204 and does not yet take control of any resources shared between the BIOS and the firmware. Once it is determined at 204 that the GPIO has been asserted by the BIOS, the firmware takes control of the shared resources at 206.

At some point after the end of the POST operation in the BIOS, a runtime Reliability, Availability and Serviceability (RAS) event of the BIOS begins at 212. At 214, the GPIO is de-asserted. This de-assertion of the GPIO is then detected by the firmware at 216. After the BIOS de-asserts the GPIO at 214 the BIOS switches the GPIO as its input at 218. At 220 the firmware delays to allow the BIOS time to switch its GPIO as an input. The firmware then asserts its GPIO at 222. The BIOS waits at 224 until it detects that the GPIO has been asserted by the firmware at 222. The firmware switches its GPIO as its input at 226 while the BIOS delays at 228 to let the firmware complete the switch of the GPIO to its input. The BIOS then de-asserts the GPIO at 230 to indicate that the BIOS has indeed taken control of the shared resources. The firmware waits at 232 until it detects that the GPIO has been de-asserted by the BIOS at 230. Then the firmware proceeds to 238 where it waits for the BIOS to assert the GPIO back. The BIOS then handles the runtime RAS event at 234. Once the BIOS has finished handling the runtime RAS event at 234, it asserts its GPIO at 236. Once the firmware detects at 238 that the GPIO has been asserted by the BIOS at 236, then the firmware takes control of the shared resources at 240. In some embodiments, the flow of FIG. 2 repeats 212, 214, 216, 218, 220, 222, 224, 226, 228, 230, 232, 234, 236, 238 and/or 240 for any further RAS events.

According to some embodiments and as described, for example, in reference to FIG. 2, a handshake mechanism is used between the BIOS and other devices of the system so that there is no clash in accessing shared resources between the BIOS and other devices such as, for example, the SSP, BMC, and/or ME, during runtime. In some embodiments, the system BIOS asserts a GPIO to indicate to other devices such as the SSP, BMC, and/or ME that the BIOS has completed POST and is relinquishing control of the shared resources.

In response to a runtime RAS event, the BIOS may need to again obtain control of the shared resources. Therefore, in some embodiments, the BIOS de-asserts the same GPIO signal to indicate to the SSP, BMC, and/or ME, for example, that the BIOS is interested in obtaining control of the shared resources. Then the BIOS switches the GPIO as its input and listens to determine whether the SSP/BMC/ME asserts it back to indicate that the control is being relinquished and that the BIOS is free to take control. The SSP, BMC, and/or ME for example, sees that the GPIO has been de-asserted, and once it is ready to relinquish control, switches the GPIO as its output and asserts it back to signal the BIOS that it has relinquished control. Then the SSP, BMC, and/or ME switches the GPIO back to its input. The BIOS then signals that it has indeed taken control of the shared resources by de-asserting the GPIO signal back to the other device (SSP, BMC, and/or ME, for example). Once the BIOS has finished the RAS event the BIOS again asserts the same GPIO signal back again to give control of the shared resources back to the other device (for example, SSP, BMC, and/or ME).

According to some embodiments, the BIOS asserts a signal (for example, such as a GPIO signal) to signal completion of POST operation to another device (for example, an SSP, BMC and/or ME). In some embodiments, a signaling mechanism using signaling (for example, using a GPIO signal) is implemented using a handshake protocol between the BIOS and the other device. This allows, for example, the BIOS to get back control of system resources such as SMBus devices from another device such as, for example, an SSP, BMC, and/or ME.

Although some embodiments have been described herein as using a GPIO signal and/or relating to an SSP, BMC, and/or ME, according to some embodiments these particular implementations may not be required. For example, other signals than a GPIO signal may be used, and/or other devices may relinquish control of shared resources to the BIOS.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method comprising:
performing a power-on self test operation using a Basic Input/Output System;
sending a signal from the Basic Input/Output System to a device to indicate that the device can take control of shared resources;
in response to a runtime Reliability, Availability and Serviceability event, sending a signal from the Basic Input/

Output System to the device to indicate that the Basic Input/Output System needs to take back control of the shared resources; and receiving a signal from the device that indicates that the Basic Input/Output System can now control the shared resources.

2. The method of claim 1, further comprising controlling the shared resources in response to the receiving.

3. The method of claim 1, wherein the sent signals and the received signal are General Purpose Input/Output signals.

4. The method of claim 1, wherein the device is at least one of a System Service Processor, a Baseboard Management Controller, and a Manageability Engine.

5. The method of claim 1, wherein the sending and the receiving are included in a handshake protocol between the Basic Input/Output System and the device.

6. The method of claim 1, wherein the shared resources comprise one or more System Bus devices.

7. A method comprising:
   performing a power-on self test operation using a Basic Input/Output System;
   receiving a signal from the Basic Input/Output System indicating that control of shared resources can be obtained;
   in response to a runtime Reliability, Availability and Serviceability event, receiving a signal from the Basic Input/Output System that indicates that the Basic Input/Output System needs to take back control of the shared resources; and
   sending a signal to the Basic Input/Output System indicating that the Basic Input/Output System can now control the shared resources.

8. The method of claim 7, further comprising relinquishing control of the shared resources.

9. The method of claim 7, wherein the received signals and the sent signal are General Purpose Input/Output signals.

10. The method of claim 7, wherein the sending and the receiving are included in a handshake protocol with the Basic Input/Output System.

11. The method of claim 7, wherein the shared resources comprise one or more System Bus devices.

12. An article comprising:
    a non-transitory readable storage medium having instructions thereon which when executed cause a computer to:
    perform a power-on self test operation using a Basic Input/Output System;
    send a signal from the Basic Input/Output System to a device to indicate that the device can take control of shared resources;
    in response to a runtime Reliability, Availability and Serviceability event, send a signal from the Basic Input/Output System to the device to indicate that the Basic Input/Output System needs to take back control of the shared resources; and
    receive a signal from the device indicating that the Basic Input/Output System can now control the shared resources.

13. The article of claim 12, wherein the instructions further cause a computer to control the shared resources in response to the receiving.

14. The article of claim 12, wherein the sent signals and the received signal are General Purpose Input/Output signals.

15. The article of claim 12, wherein the device is at least one of a System Service Processor, a Baseboard Management Controller, and a Manageability Engine.

16. The article of claim 12, wherein the sending and the receiving are included in a handshake protocol between the Basic Input/Output System and the device.

17. The article of claim 12, wherein the shared resources comprise one or more System Bus devices.

18. An article comprising:
    a non-transitory readable storage medium having instructions thereon which when executed cause a computer to:
    perform a power-on self test operation using a Basic Input/Output System;
    receive a signal from the Basic Input/Output System indicating that control of shared resources can be obtained;
    in response to a runtime Reliability, Availability and Serviceability event, receive a signal from the Basic Input/Output System that indicates that the Basic Input/Output System needs to take back control of the shared resources; and
    send a signal to the Basic Input/Output System indicating that the Basic Input/Output System can now control the shared resources.

19. The article of claim 18, wherein the instructions further cause a computer to relinquish control of the shared resources.

20. The article of claim 18, wherein the received signals and the sent signal are General Purpose Input/Output signals.

21. The article of claim 18, wherein the sending and the receiving are included in a handshake protocol with the Basic Input/Output System.

22. The article of claim 18, wherein the shared resources comprise one or more System Bus devices.

* * * * *

UNITED STATES PATENT AND TRADEMARK OFFICE
CERTIFICATE OF CORRECTION

| | |
|---|---|
| PATENT NO. | : 8,402,186 B2 |
| APPLICATION NO. | : 12/459423 |
| DATED | : March 19, 2013 |
| INVENTOR(S) | : Sarathy Jayakumar |

Page 1 of 1

It is certified that error appears in the above-identified patent and that said Letters Patent is hereby corrected as shown below:

On the Title page, in item (54), and in the specification, column 1, line 2, Title,
delete "BI-DIRECTIONAL HANDSHAKE FOR ADVANCED RELIABILTY AVAILABILITY AND SERVICEABILITY" and
insert -- BI-DIRECTIONAL HANDSHAKE FOR ADVANCED RELIABILITY AVAILABILITY AND SERVICEABILITY --, therefor.

Signed and Sealed this
Thirteenth Day of August, 2013

Teresa Stanek Rea
*Acting Director of the United States Patent and Trademark Office*